United States Patent
Fletcher et al.

(10) Patent No.: US 6,611,920 B1
(45) Date of Patent: Aug. 26, 2003

(54) CLOCK DISTRIBUTION SYSTEM FOR SELECTIVELY ENABLING CLOCK SIGNALS TO PORTIONS OF A PIPELINED CIRCUIT

(75) Inventors: Thomas D. Fletcher, Portland, OR (US); Javed S. Barkatullah, Portland, OR (US); Douglas Carmean, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/489,153

(22) Filed: Jan. 21, 2000

(51) Int. Cl.[7] .................................................. G06F 1/32
(52) U.S. Cl. ........................ 713/322; 713/320; 713/324
(58) Field of Search ................................... 713/320, 600

(56) References Cited

U.S. PATENT DOCUMENTS

| | | | | |
|---|---|---|---|---|
| 4,833,655 A | * | 5/1989 | Wolf et al. ................... 365/221 |
| 5,036,489 A | * | 7/1991 | Theobald ...................... 365/73 |
| 5,388,265 A | | 2/1995 | Volk ............................ 395/750 |
| 5,392,437 A | | 2/1995 | Matter et al. ................ 395/750 |
| 5,586,332 A | | 12/1996 | Jain et al. .................... 395/750 |
| 5,623,647 A | | 4/1997 | Maitra ......................... 395/556 |
| 5,670,898 A | * | 9/1997 | Fang ........................... 326/121 |
| 5,835,435 A | | 11/1998 | Bogin et al. ................. 365/227 |
| 5,890,004 A | | 3/1999 | Poisner .................. 395/750.01 |
| RE36,189 E | * | 4/1999 | Carter et al. ................. 713/324 |
| 5,978,831 A | * | 11/1999 | Ahamed et al. ............. 709/105 |
| 6,021,506 A | | 2/2000 | Cho et al. .................... 713/601 |
| 6,081,141 A | * | 6/2000 | Young ......................... 327/116 |
| RE36,839 E | * | 8/2000 | Simmons et al. ............ 326/101 |
| 6,247,134 B1 | * | 6/2001 | Sproch et al. ............... 713/320 |
| 6,393,579 B1 | * | 5/2002 | Piazza ......................... 713/600 |

* cited by examiner

*Primary Examiner*—Dennis M. Butler
*Assistant Examiner*—Mark Connolly
(74) *Attorney, Agent, or Firm*—Kenyon & Kenyon

(57) ABSTRACT

A hierarchical power control system for an integrated circuit may be integrated into a clocking system that includes a global clock generator, a clock distribution network in communication with the global clock generator and a plurality of functional unit blocks each in communication with the global clock generator. The hierarchical power control system may include a first power controller provided in a communication path between the global clock generator and the clock distribution network, and a plurality of second power controllers, one provided in each communication path between the clock distribution network and a functional unit block.

38 Claims, 4 Drawing Sheets

100

200

CLOCK DISTRIBUTION SYSTEM FOR SELECTIVELY ENABLING CLOCK SIGNALS TO PORTIONS OF A PIPELINED CIRCUIT

BACKGROUND

The present invention relates to a clock distribution system in an integrated circuit and, more particularly, for a clock distribution system that selectively disables selective units in an integrated circuit.

The increased processing power of modern integrated circuits has caused a corresponding increase in the power consumption of those circuits. Increased power consumption can lead to a variety of disadvantageous properties including generation of heat that may damage the integrated circuit, decreased battery life for portable devices and higher overall operating expense for computer systems. With all of these disadvantages, there is an increasing interest in the development of integrated circuits that provide increased processing power while, at the same time, decreased power consumption.

Power management techniques are commonplace in the modern computer. Users of domestic personal computers will recognize that computer monitors, disk drives and the like often are disabled when not in use. However, such techniques are not able to keep pace with the ever-increasing power demands made by newer generations of integrated circuits. Accordingly, there remains a need in the art for an integrated circuit architecture that contributes to reduced power consumption of the integrated circuit.

SUMMARY

Embodiments of the present invention provide a hierarchical power control system for an integrated circuit. The power control system may be integrated in a clocking system that includes a global clock generator, a clock distribution network in communication with the global clock generator and a plurality of functional unit blocks each in communication with the global clock generator. The hierarchical power control system may include a first power controller provided in a communication path between the global clock generator and the clock distribution network, and a plurality of second power controllers, one provided in each communication path between the clock distribution network and a functional unit block.

DETAILED DESCRIPTION

Embodiments of the present invention provide a clock distribution scheme for an integrated circuit that provides advanced power control by disabling clock signals that otherwise would be input to portions of the integrated circuit that are not being used. By disabling propagation of the clock signal to inactive circuit elements, those circuit elements draw far less power than if the clock signal were input to them. Further embodiments provide a hierarchical clock distribution scheme, one that permits clock disabling to be done to the chip as a whole, to entire functional units blocks or to portions of a functional unit block.

Figure 1:
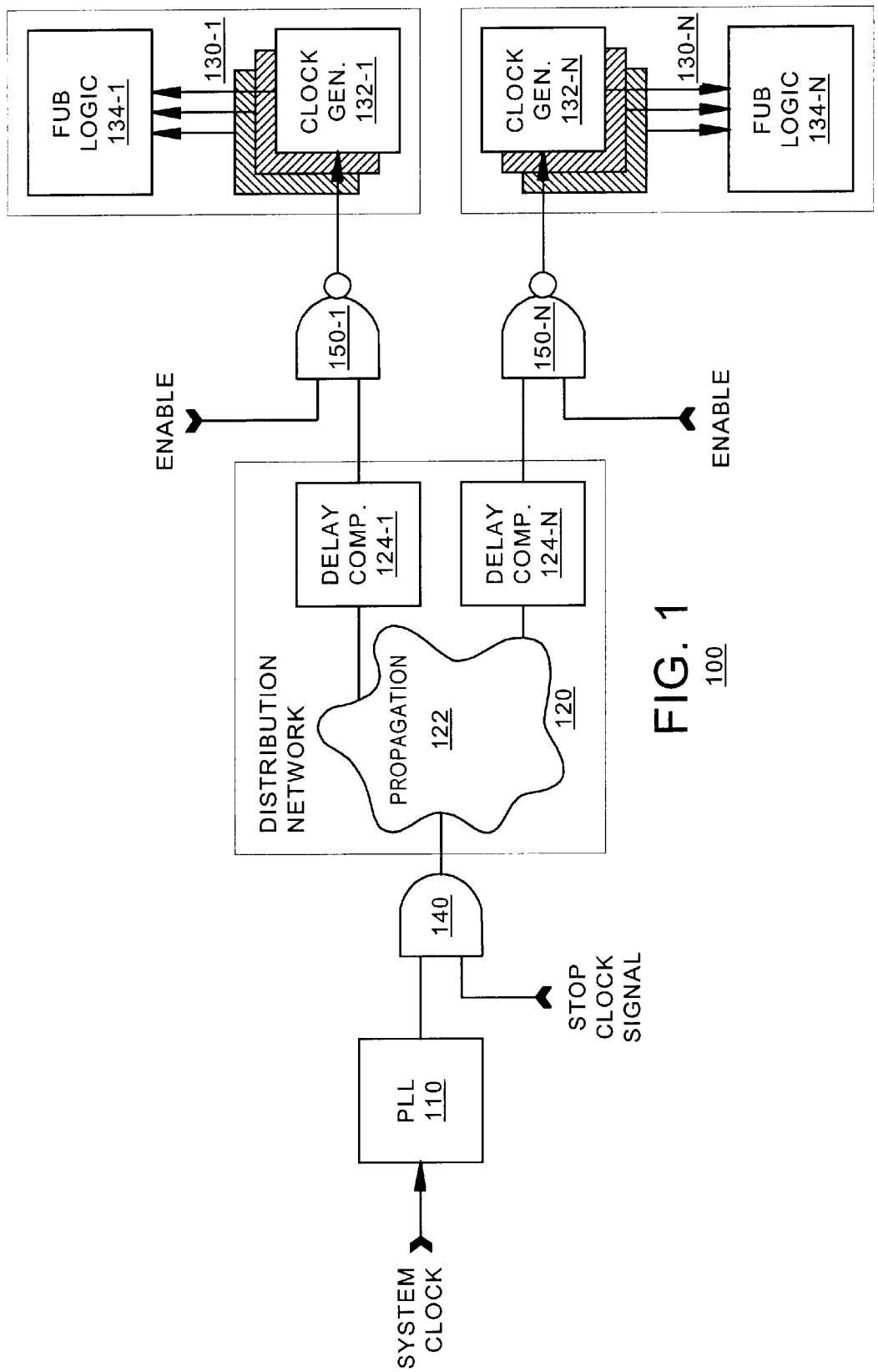
FIG. 1 is a block diagram of a clock network according to an embodiment of the present invention.

FIG. 1 illustrates a clock network 100 of an integrated circuit according to an embodiment of the present invention. In this embodiment, the network 100 is populated by a phase locked loop 110 ("PLL"), a distribution network 120 and a plurality of functional unit blocks ("FUBs") 130.1, 130.N. The PLL 110 generates an global clock signal from an input system clock signal. The distribution network 120 distributes the global clock signal throughout the integrated circuit to the various FUBs 130.1, 130.N. Typically, the distribution network 120 includes various propagation paths (represented as network 122) that distribute the global clock signal through diverse paths across the integrated circuit. The distribution network 120 also may include a plurality of delay compensators 124.1, 124.N adapted to correct any timing skew that may be introduced by path length variations or other effects. Ideally, edges of the clock signals of each path are output from respective delay compensators 124.1, 124.N simultaneously.

The FUBs 130.1, 130.N each may include one or more clock generators 132.1, 132.N and FUB logic 134.1, 134.N. The clock generators 132.1, 132.N may generate clock signals of a type that is appropriate for use in the respective FUB logic 134.1, 134.N. Typically, each set of FUB logic 134.1, 134.N is dedicated to a unique function to be performed by the integrated circuit; different sets of FUB logic 134.1, 134.N may operate in response to different types of clock signals.

An embodiment of the present invention imposes a hierarchical power control system upon such a clock network 100. In this embodiment, power control may be applied to various propagation paths for the clock signal. A first point of power control may be applied at an output of the PLL 110. It may disable the global clock signal from being propagated to any FUB in the integrated circuit. A second point of power control may be applied at an input to each FUB 130.1, 130.N on the integrated circuit. This second position in the hierarchy permits individual FUBs to be disabled as integral units. A third point of power control may be applied at discrete points within individual FUBs. This third position in the hierarchy permits inactive portions of FUBs to be disabled while active portions of the FUBs remain enabled.

The first layer of power control may be provided at an output of the PLL 110. For example, as shown in FIG. 1, the global clock signal from the PLL 110 may be input to an AND gate 140. An output of the AND gate may be input to the distribution network 120. A stop clock signal may be input to the AND gate 140 over a second input. This stop clock signal constitutes a masking signal that can prevent propagation of the clock signal past the AND gate 140. By deactivating the stop clock signal (e.g., setting it to logical zero) the AND gate 140 will prevent the global clock signal from propagating anywhere within the integrated circuit.

The second layer of power control may disable individual FUBs 130.1, 130.N. In the example of FIG. 1, the power control feature may be provided by a plurality of NAND gates 150.1, 150.N provided in propagation paths between respective delay compensators 124.1, 124.N from the distribution network 120 and the FUBs 130.1, 130.N. Each NAND gate 150.1, 150.N may receive a disabling signal on a second.input thereof. In this embodiment, the clock signal from the distribution network 120 will be permitted to propagate through a NAND gate (say, 150.1) if the enable input to the NAND gate 150.1 is active ($V_{CC}$). Otherwise, the NAND gate will not output an oscillating clock signal to the clock generators 130.1 in the respective FUB 130.1.

Figure 2:
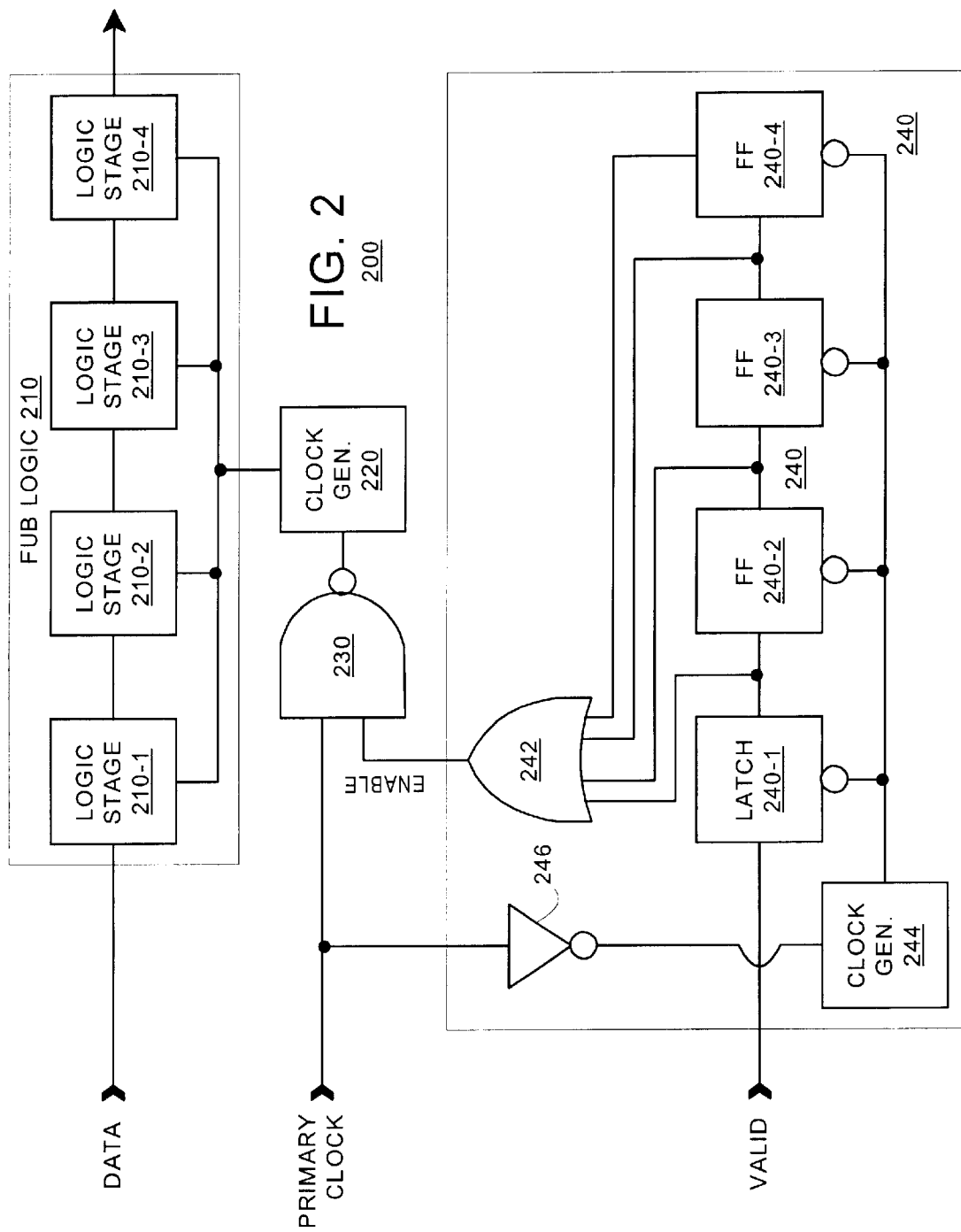
FIG. 2 is a block diagram of a functional unit block according to an embodiment of the present invention.

FIG. 2 is a block diagram of an exemplary FUB 200 according to an embodiment of the present invention. According to an embodiment, the FUB 200 itself may generate the enable signal that permits the global clock signal to be input to the FUB.

As is illustrated in FIG. 2, FUB 200 may include a FUB logic 210, and a pipeline of logic stages 210.1–210.N that implement the functionality of the particular FUB 200. Each logic stage 210.1–210.N is shown as driven by a single clock generator 220. The clock generator 220 is controlled by a NAND gate 230 having two inputs: a first input receives a primary clock signal such as from distribution network 120 of FIG. 1 and a second input receives an enable signal.

According to an embodiment, a FUB 200 may receive a valid indicator signal when active data is input to the FUB 200. It may store the valid indicator signal so long as the active data propagates among the various stages 210.1–210.N of the FUB logic 210. This valid indicator signal may be used to derive the enable signal that enables the clock generator 220.

In the embodiment shown in FIG. 2, the FUB 200 includes a chain of propagation logic 240 that stores the valid signal. The propagation logic 240 may include the same number of stages 240.1–240.N as there are logic stages 210.1–210.N in the FUB logic 210. A first stage 240.1 may be a latch, successive stages 240.2–240.N may be flip-flops. Thus, in this embodiment, the valid signal propagates through stages of propagation logic 240 as the data signal propagates through stages of FUB logic 210. The propagation stages 240.1–240.N may be active low enabled devices. Accordingly, they may propagate a valid indicator signal through the stages one-half cycle in advance of the propagation of a data signal through the FUB logic 210. An OR gate 242 may generate the enable signal as a logical "or" of the state of the valid signal as it is output from the propagation stages 240.1–240.N.

The propagation logic 240 may include a clock generator 244 coupled to the primary clock signal via an inverter 246. The inverter 246 imposes a delay upon the propagation of the primary clock signal in an amount corresponding to the delay imposed by the NAND gate 230.

The embodiment of FIG. 2 maintains the entirety of the FUB logic 210 enabled when an active valid indicator signal is present anywhere in the propagation logic 240. When there is no active valid indicator signal within the propagation logic 240, the propagation logic disables the clock generator 230 and powers down the FUB 200.

While FIG. 2 illustrates an enable signal as being generated from within a FUB, the principles of the present invention apply to embodiments where the enable signal is generated from a source that is external to the FUB. For example, schedulers are well-known elements within processors and the like (not shown in FIG. 1). A scheduler typically determines an order of instruction execution within a processor core and routes data among a variety of ancillary processing elements, such as arithmetic logic units, to cause the instructions to be executed. It may occur that the ancillary processing elements may be provided each in their own FUB 130.1, 130.N. In such an embodiment, the scheduler may selectively enable or disable power control elements within the integrated circuit as these FUBs are allocated and deallocated for use.

Figure 3:
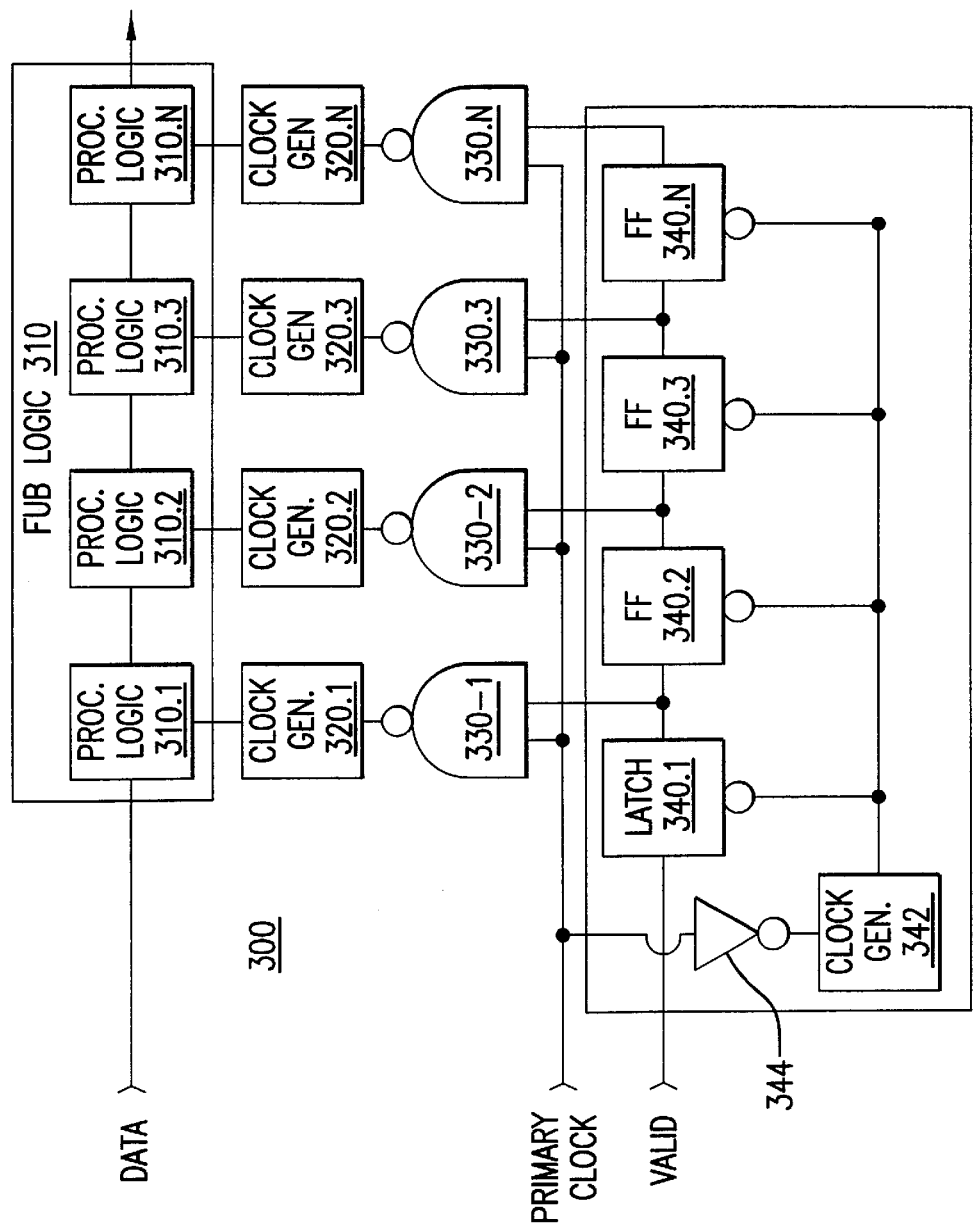
FIG. 3 is a block diagram of a functional unit block according to an alternate embodiment of the present invention.

FIG. 3 illustrates a FUB 300 according to an alternate embodiment of the present invention. The embodiment of FIG. 3 illustrates a FUB 300 that provides for power-down of individual FUB logic stages 310.1–310.N rather than the entirety of the FUB logic 310.

As in FIG. 2, the FUB 300 of FIG. 3 is shown as being populated by a pipeline of logic stages 310.1–310.N. In the embodiment of FIG. 3, the FUB 300 may include a separate clock generator 320.1–320.N, one provided in association with each of the FUB logic stages 310.1–310.N. Each clock generator 320.1–320.N is driven by a respective NAND gate 330.1–330.N. Each NAND gate 330.1–330.N receives a primary clock signal on a first input and a respective enable signal on a second input thereof.

The embodiment of FIG. 3 includes a propagation circuit 340 that generates the enable signals to each of the NAND gates 330.1–330.N. The propagation circuit 340 may be populated by a propagation chain that includes a latch 340.1 followed by a series of flip-flops 340.2–340.N. Each of the latch and the series of flip-flops 340.1–340.N may be active low enabled devices clocked by a clock generator 342. The clock generator 342 is itself driven by the primary clock signal via an inverter 344. This timing relationship permits the associated clock generator 320.3 to become fully active prior to the arrival of the data at the associated logic stage 310.3.

During operation, a first data signal may be input to the first stage of FUB logic during a first clock cycle. One half cycle in advance of the arrival of the first data signal, the valid signal may be set to an active level ($V_{CC}$). The latch 340.1 will be open thus permitting the active valid signal to be output by the latch 340.1 to the first flip-flop 340.2. The output of the latch 340.1 may cause the first NAND gate 330.1 to enable the clock generator 320.1 associated with the first stage of FUB logic 310.1. Thus, the first stage of FUB logic 310.1 will fully energized thus permitting instantaneous processing of the first data signal. The latch may close during a second phase of the first clock cycle, permitting the valid indicator signal to be deactivated without change in the output of the latch 340.1

In advance of a second clock cycle, the first flip flop 340.2 captures the valid indicator signal input to it from the latch 340.1. The output of the flip-flop 340.2 causes the second NAND gate 330.2 to pass the primary clock signal to the second clock generator 320.2, thus enabling the second stage of FUB logic 310.2.

If no new data is to be input to the FUB 300 during the second clock cycle, the valid indicator signal may be deactivated. In this case, the output of the latch 340.1 may be deactivated which would cause the first NAND gate 330.1 to disable the first clock generator 320.1. The first stage of FUB logic 310.1 would be deactivated.

During subsequent clock cycles, the first data signal and the valid indicator signal propagate through successive stages until they are output from a terminal stage N in their respective chains. For each stage, the valid indicator signal advances one-half a cycle earlier than the first data signal. This enables the associated NAND gate to pass the primary clock signal to an associated clock generator.

As is known for pipelined logic, different stages of logic in a pipeline may process different data signals. Thus, it is possible to input a first data signal to the logic during a first clock cycle then a second data signal to the same logic during a second clock cycle. Typically, the logic stages are configured so that a first stage of logic completes its processing of the first data signal, outputs a result to the second stage and refreshes its circuits for a second data signal all within a single clock cycle. Thus, the chain of FUB logic may operate on several independent data signals independently so long as each data signal will be in a separate stage of processing.

The FUB 300 of FIG. 3 finds application with such an embodiment. It may occur that every stage 340.1–340.N within the FUB logic chain 310 will be processing various data signals at once. In such a case, multiple valid indicator signals will have been input to the FUB 300. These valid indicator signals may cause the NAND gates 330.1–330.N to pass the primary clock signal to each of the FUB's clock generators 320.1–320.N It may also occur that the FUB 300 may process only a single data signal over an extended period of time. In such a case, the data signal will be input to the FUB 300 along with an associated valid indicator signal and may propagate through the FUB 300 as described above. In this case, the propagation of the valid indicator signal will impose a "ripple" effect upon the FUB logic stages 310.1–310.N.

The foregoing description has presented power control gates alternately as AND gates and NAND gates. Embodiments of the present invention also find application with other power control gates, such as OR and NOR gates (not shown). OR and NOR gates may be appropriate for active low signals wherein a logical 1 may be represented by a ground potential rather than Vcc as described above. In such an embodiment, an inactive enable signal, (for example, one intended to disable a FUB) may transition toward $V_{CC}$. A $V_{CC}$ input to an OR gate would cause the OR gate to generate $V_{CC}$ as an output, effectively masking any clock signal input to a second input of the OR gate. A $V_{CC}$ input to a NOR gate would force an output of the NOR gate to ground, effectively masking any clock signal that would be input to a second input of the NOR gate. Thus, OR and NOR gates may be used for power control in appropriate embodiments.

Figure 4:
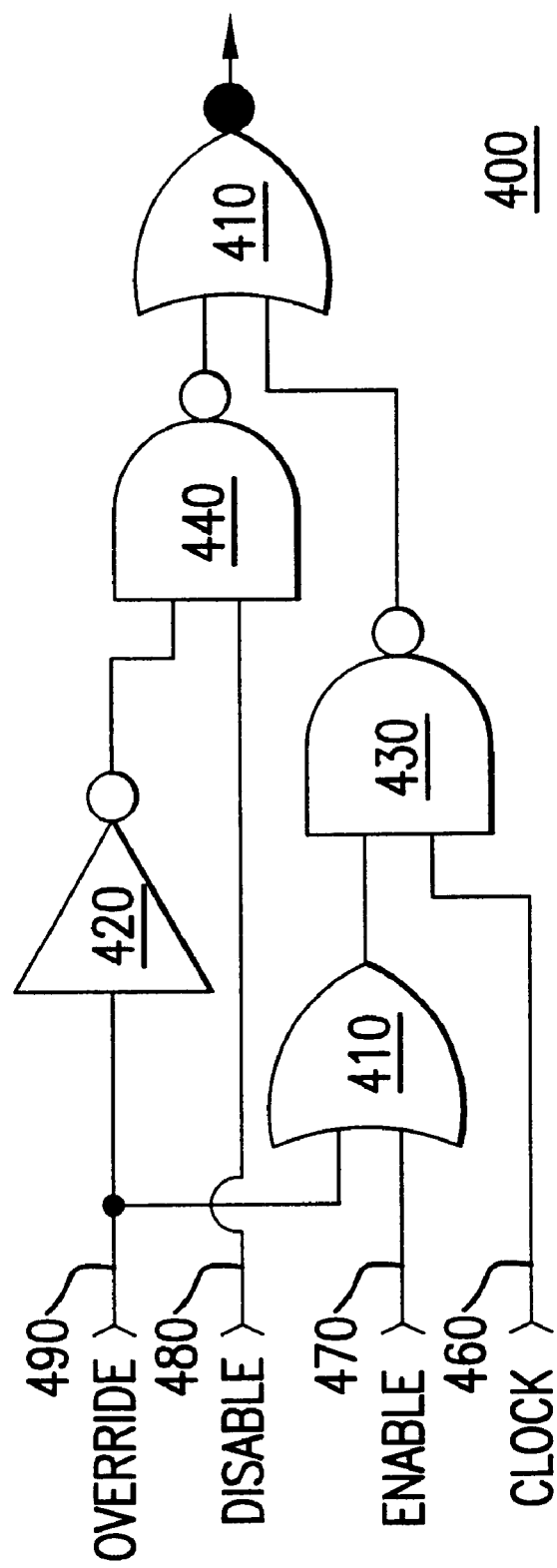
FIG. 4 is a block diagram of a power control circuit according to an embodiment of the present invention.

FIG. 4 illustrates a power controller 400 according to another embodiment of the present invention. This embodiment provides for selective enabling of a clock signal, for selective disabling of a clock signal and also for override control. In the embodiment shown in FIG. 4, the power controller 400 is populated by an OR gate 410, an inverter 420, a NAND gate 430, an AND gate 440 and a NOR gate 450. The power controller 400 also may include terminals 460–490 for input of respective clock, enable, disable and override signals.

According to an embodiment, the enable and override signals may be input to the OR gate 410. An output of the OR gate 410 may be input to the AND gate 430. The clock signal may be input to the NAND gate 430 as well. An output of the NAND gate 430 may be input to the NOR gate 450.

On another path, the override signal may be inverted by the inverter 420 and input to the AND gate 440. The disable signal also may be input to the AND gate 440. An output of the AND gate may be input to the NOR gate on a second input. An output of the NOR gate 450 may be output from the power controller 400.

During operation, when the clock is supposed to be passed from the power controller to other circuitry, it is expected that the override and disable signal will be deactivated (maintained at ground) and the enable signal will be activated (maintained at $V_{CC}$). In this case, the enable signal propagates through the OR gate and causes the NAND gate 430 to invert the clock signal. The disable signal forces the output of the AND gate to be inactive (ground). The output of the AND gate 440 causes the NOR gate 450 to invert the output of the NAND gate 430. The inverted clock signal from NAND gate 430 is inverted again and returned to its original value.

If, during operation, the disable signal is activated and the override signal remains at its normally inactive state, the AND gate 440 will generate an active output. In response, the NOR gate 450 will generate an inactive output (ground), regardless of the state of the signals generated by the NAND gate 430. In this case, the disable signal can prevent propagation of the clock signal regardless of the values of the clock signal or the enable signal.

If, during operation, the override signal is activated, it is inverted and causes the output of the AND gate 440 to be inactive regardless of the value of the disable signal further, the active override signal activates the output of the OR gate regardless of the state of the enable signal. In this circumstance, the clock signal propagates through the NAND gate/NOR gate combination and is output from the power controller 400. Thus, the override signal causes the clock signal to pass through the power controller regardless of the values of the enable signal.

The cooperation of the enable signal, the disable signal and the override signal provides integrated circuit designers with opportunities for multi-faceted power control. In one embodiment, it is envisioned that the override signal could be used globally during power up. As is known, power up provides opportunities for circuit contention which can damage an integrated circuit. Such contention may extend to the circuits that generate the enable and disable signals. The override signal may be used to immunize the clock signal from the effects of any such contention.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A power control system for an integrated circuit, comprising:
   a global clock generator,
   a clock distribution network in communication with the global clock generator,
   a plurality of functional unit blocks each in communication with the global clock generator, and
   a hierarchical power control system comprising:
      first power controller provided in a communication path between the global clock generator and the clock distribution network, and
      a plurality of second power controllers, one provided in each communication path between the clock distribution network and a functional unit block,
      wherein at least one of the first or second power controllers comprises:
         an OR gate having inputs for an enable signal and an override signal,
         a NAND gate having inputs for a clock signal and for an output of the OR gate,
         an inverter having an input for the override signal,
         an AND gate having an input for a disable signal and an output of the inverter, and
         a NOR gate having inputs for an output of the AND gate and an output for the NAND gate.

2. The power control system of claim 1, wherein the first power controller is an AND gate having an input for an active low disable signal.

3. The power control system of claim 1, wherein the first power controller is a NAND gate having an input for an active low disable signal.

4. The power control system of claim 1, wherein the first power controller is a NOR gate having an input for an active high disable signal.

5. The power control system of claim 1, wherein the first power controller is an OR gate having an input for an active high disable signal.

6. The power control system of claim 1, wherein at least one FUB has an output for an enable signal, the enable signal being input to one of the second power controllers associated with the one FUB.

7. The power control system of claim 1, wherein one of the second power controllers has an input for an enable signal that originates in another part of the integrated circuit.

8. A functional unit block comprising:
   a FUB logic circuit having a plurality of stages of FUB logic,
   a propagation circuit to receive a valid indicator signal, the propagation circuit having propagation stages, one corresponding to each stage of FUB logic,
   a power controller to receive a clock signal,
   a clock generator coupled to the power controller and having an output coupled to each of the stages of FUB logic, and
   an OR gate having inputs coupled to outputs of each propagation stage and having an output coupled to the power controller.

9. The power control system of claim 8, wherein the power controller is an AND gate having an input for an active low valid indicator signal.

10. The power control system of claim 8, wherein the power controller is a NAND gate having an input for an active low valid indicator signal.

11. The power control system of claim 8, wherein the power controller is a NOR gate having an input for an active high valid indicator signal.

12. The power control system of claim 8, wherein the power controller is an OR gate having an input for an active high valid indicator signal.

13. The power control system of claim 8, wherein the power controller comprises:
   an OR gate having inputs for an enable signal and an override signal,
   a NAND gate having inputs for a clock signal and for an output of the OR gate,
   an inverter having an input for the override signal,
   an AND gate having an input for a disable signal and an output of the inverter, and
   a NOR gate having inputs for an output of the AND gate and an output for the NAND gate.

14. A functional unit block comprising:
   a FUB logic circuit having a plurality of stages of FUB logic,
   a propagation circuit to receive a valid indicator signal, the propagation circuit having propagation stages, one corresponding to each stage of FUB logic,
   a plurality of clock generators, one provided for each stage of FUB logic, and
   a plurality of power controllers, one provided for each stage of FUB logic, a first input of each power controller coupled to a clock signal and a second input of each power controller coupled to an output from a respective propagation stage.

15. The power control system of claim 14, wherein the power controllers are AND gates having an input for an active low disable signal.

16. The power control system of claim 14, wherein the power controllers are NAND gates having an input for an active low disable signal.

17. The power control system of claim 14, wherein the power controllers are NOR gates having an input for an active high disable signal.

18. The power control system of claim 14, wherein the power controllers are OR gates having an input for an active high disable signal.

19. The power control system of claim 14, wherein the wherein the power controllers comprise:
   an OR gate having inputs for an enable signal and an override signal,
   a NAND gate having inputs for a clock signal and for an output of the OR gate,
   an inverter having an input for the override signal,
   an AND gate having an input for a disable signal and an output of the inverter, and
   a NOR gate having inputs for an output of the AND gate and an output for the NAND gate.

20. A clock control circuit for power control, comprising:
   an OR gate having inputs for an enable signal and an override signal,
   a NAND gate having inputs for a clock signal and for an output of the OR gate,
   an inverter having an input for the override signal,
   an AND gate having an input for a disable signal and an output of the inverter, and
   a NOR gate having inputs for an output of the AND gate and an output for the NAND gate.

21. Apparatus, comprising:
   a pipelined logic circuit comprising a plurality of cascaded logic stages, each stage to process input data input in one clock cycle,
   a power control circuit comprising a plurality of cascaded power control stages, at least one power control stage for each logic stage, an output of each power control stage coupled to a control input of a respective logic stage, wherein each power control stage is to propagate an input enable signal input in one clock cycle and a first power control stage is to receive an enable signal one-half clock cycle in advance of input data being input to a first logic stage.

22. The apparatus of claim 21, wherein at least one power control stage comprises:
   a latch, having an input coupled to a previous power control stage, and
   a controller, having inputs coupled to an output of the latch and to a clock.

23. The apparatus of claim 22, wherein the controller is an AND gate.

24. The apparatus of claim 22, wherein the controller is a NAND gate.

25. The apparatus of claim 22, wherein the controller is a NOR gate.

26. The apparatus of claim 22, wherein the controller is an OR gate.

27. Apparatus, comprising:
   a power controller,
   a pipelined logic circuit comprising a plurality of cascaded logic stages, each stage to process input data input in one clock cycle, a power control circuit comprising a plurality of cascaded power control stages, at least one power control stage for each logic stage, an output of each power control stage coupled to the power controller, wherein each power control stage is to propagate an input enable signal input in one clock cycle and a first power control stage is to receive an enable signal one-half clock cycle in advance of input data being input to a first logic stage, wherein the power controller is to power the logic circuit so long as the enable signal is present on any output of the power control stages.

28. The apparatus of claim 27, wherein the power controller is an AND gate having an input for an active low valid indicator signal.

29. The apparatus of claim 27, wherein the power controller is a NAND gate having an input for an active low valid indicator signal.

30. The apparatus of claim 27, wherein the power controller is a NOR gate having an input for an active high valid indicator signal.

31. The apparatus of claim 27, wherein the power controller is an OR gate having an input for an active high valid indicator signal.

32. The apparatus of claim 27, wherein the power controller comprises:

an OR gate having inputs for an enable signal and an override signal, a NAND gate having inputs for a clock signal and for an output of the OR gate, an inverter having an input for the override signal, an AND gate having an input for a disable signal and an output of the inverter, and a NOR gate having inputs for an output of the AND gate and an output for the NAND gate.

33. A method, comprising, in a pipestaged logic circuit:
inputting data to a first logic stage of the logic circuit,
processing the input data through successive logic stages of the logic circuit, one stage per clock cycle,
inputting an enable signal to a first stage of a power control circuit,
propagating the enable signal through successive stages of the power control circuit, one stage per clock cycle and, as the enable signal reaches each stage of the power control circuit, powering a corresponding logic stage in the logic circuit,
wherein the enable signal is input to the first stage of the power control circuit one-half of a clock cycle in advance of the inputting data to the first logic stage.

34. The method of claim 33, wherein the enable signal is active low.

35. The method of claim 33, wherein the enable signal is active high.

36. A method, comprising, in a pipestaged logic circuit:
inputting data to a first logic stage of the logic circuit,
processing the input data through successive logic stages of the logic circuit, one stage per clock cycle,
inputting an enable signal to a first stage of a power control circuit,
propagating the enable signal through successive stages of the power control circuit, one stage per clock cycle and, so long as the enable signal is present in any stage of the power control circuit, powering the logic circuit,
wherein the enable signal is input to the first stage of the power control circuit one-half of a clock cycle in advance of the inputting data to the first logic stage.

37. The method of claim 36, wherein the enable signal is active low.

38. The method of claim 36, wherein the enable signal is active high.

* * * * *